(12) United States Patent
Oh

(10) Patent No.: US 12,142,970 B2
(45) Date of Patent: Nov. 12, 2024

(54) MOTOR

(71) Applicant: LG INNOTEK CO., LTD., Seoul (KR)

(72) Inventor: Sung Joo Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 311 days.

(21) Appl. No.: 17/636,395

(22) PCT Filed: Aug. 18, 2020

(86) PCT No.: PCT/KR2020/010958
§ 371 (c)(1),
(2) Date: Feb. 18, 2022

(87) PCT Pub. No.: WO2021/034072
PCT Pub. Date: Feb. 25, 2021

(65) Prior Publication Data
US 2022/0278574 A1 Sep. 1, 2022

(30) Foreign Application Priority Data
Aug. 19, 2019 (KR) .................. 10-2019-0101189

(51) Int. Cl.
*H02K 1/278* (2022.01)
*H02K 21/14* (2006.01)
*H02K 29/03* (2006.01)

(52) U.S. Cl.
CPC ............ *H02K 1/278* (2013.01); *H02K 21/14* (2013.01); *H02K 29/03* (2013.01)

(58) Field of Classification Search
CPC  H02K 1/27; H02K 1/28; H02K 1/274; H02K 1/30; H02K 7/04; H02K 2201/06
(Continued)

(56) References Cited

U.S. PATENT DOCUMENTS

| 6,222,288 B1* | 4/2001 | Benito Izquierdo ... H02K 29/03 310/216.011 |
| 7,067,948 B2* | 6/2006 | Yamaguchi ............ H02K 21/16 310/156.47 |

(Continued)

FOREIGN PATENT DOCUMENTS

| EP | 1 450 462 A1 | 8/2004 |
| JP | 2003-32927 A | 1/2003 |

(Continued)

*Primary Examiner* — Burton S Mullins
(74) *Attorney, Agent, or Firm* — Birch, Stewart, Kolasch & Birch, LLP

(57) ABSTRACT

The present invention may provide a motor including a rotor and a stator disposed to correspond to the rotor, wherein the rotor includes a first rotor core and a second rotor core stacked on each other in an axial direction, the first rotor core includes a first surface on which a magnet is disposed and a first hole which passes through the first rotor core in the axial direction, the second rotor core includes a second surface on which a magnet is disposed and a second hole which passes through the second rotor core in the axial direction, the first surface and the second surface are disposed to be misaligned with each other around a center in the axial direction, and the first hole and the second hole are disposed to be aligned with each other.

19 Claims, 12 Drawing Sheets

(58) Field of Classification Search
USPC .......................... 310/156.12, 156.13, 156.25
See application file for complete search history.

(56) References Cited

U.S. PATENT DOCUMENTS

| | | | |
|---|---|---|---|
| 8,896,176 B2* | 11/2014 | Ryu | H02K 1/276 |
| | | | 310/156.09 |
| 9,112,393 B2* | 8/2015 | Jayasoma | H02K 1/2781 |
| 9,484,776 B2* | 11/2016 | Kong | H02K 1/278 |
| 10,177,637 B2* | 1/2019 | Takizawa | H02K 29/03 |
| 10,439,459 B2* | 10/2019 | Udo | H02K 1/28 |
| 2013/0285500 A1 | 10/2013 | Kinashi | |

FOREIGN PATENT DOCUMENTS

| | | |
|---|---|---|
| JP | 2006-304407 A | 11/2006 |
| JP | 2013-230047 A | 11/2013 |
| JP | 2014-3795 A | 1/2014 |

\* cited by examiner

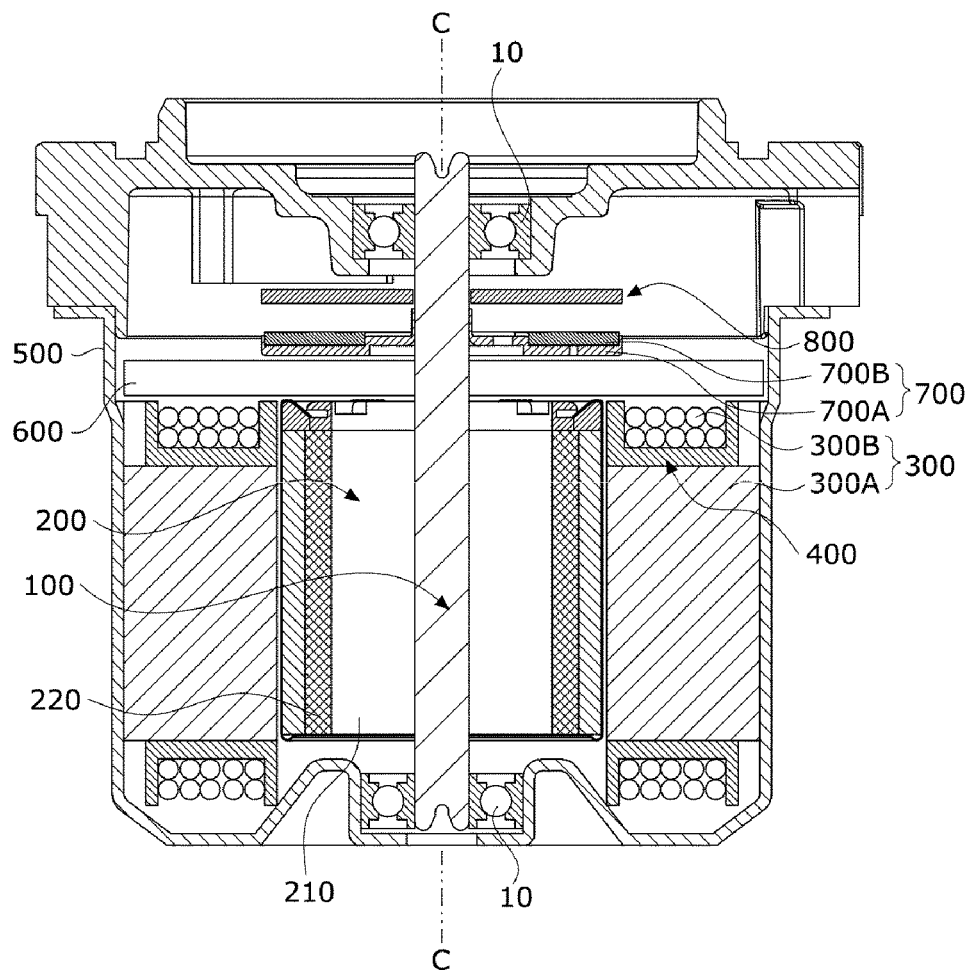
[FIG. 1]

[FIG. 2]
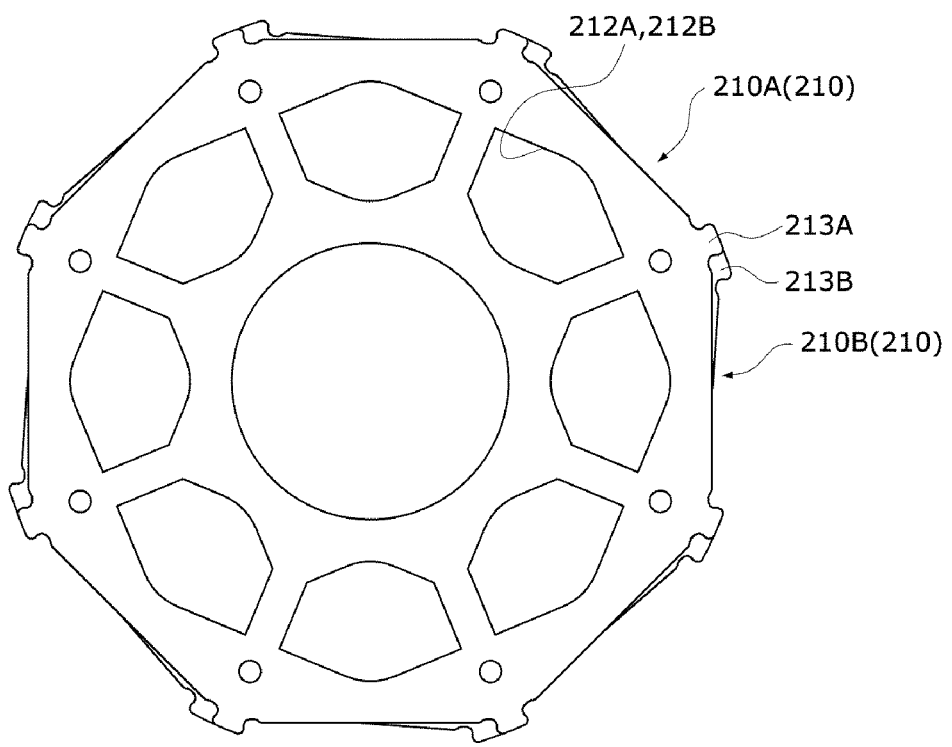

[FIG. 3]
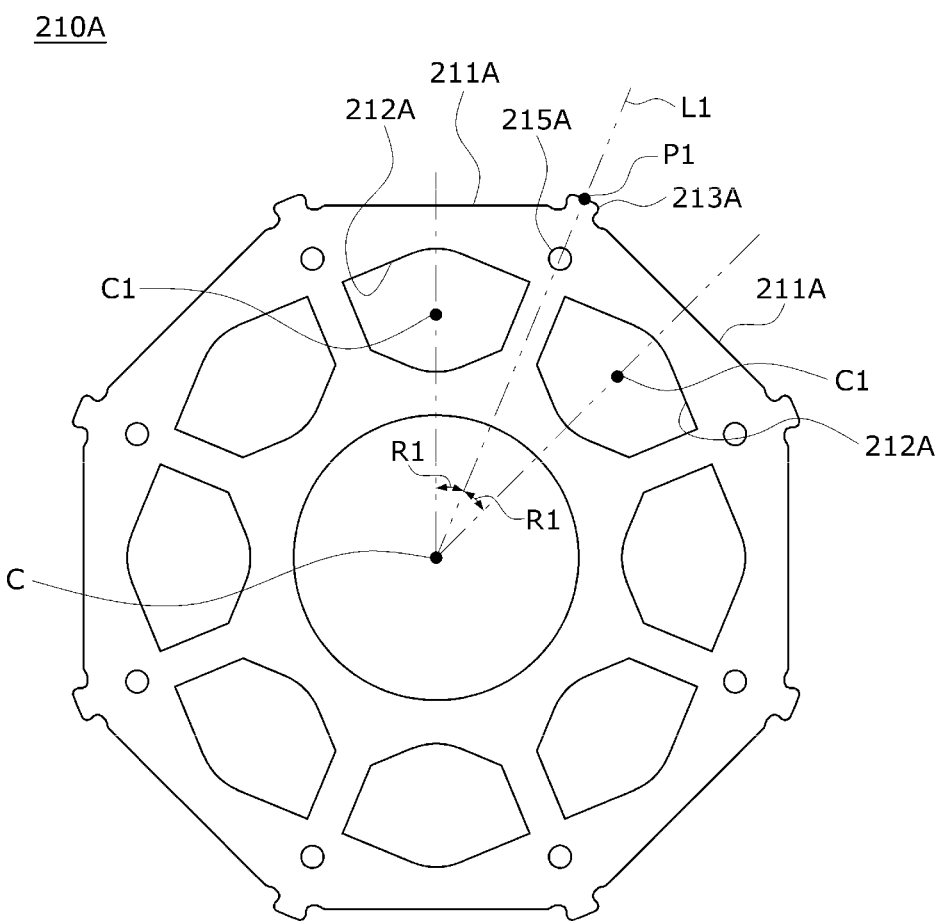

[FIG. 4]
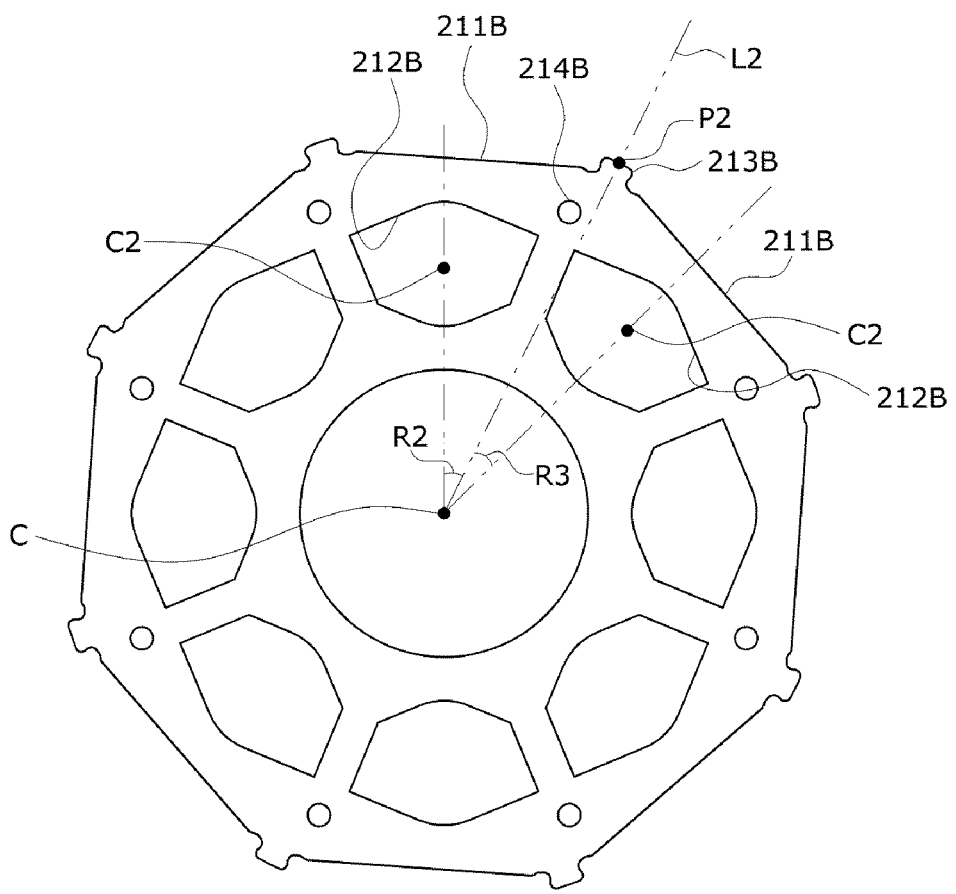

[FIG. 5]
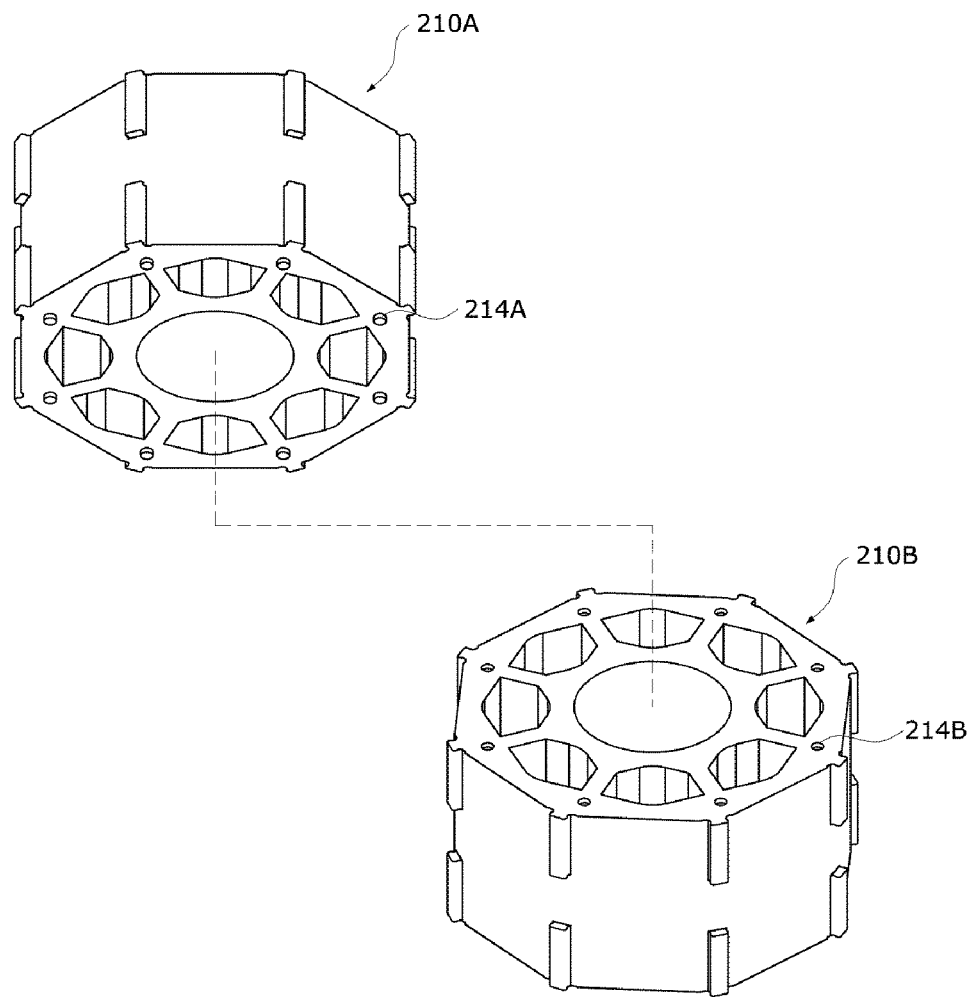

[FIG. 6]
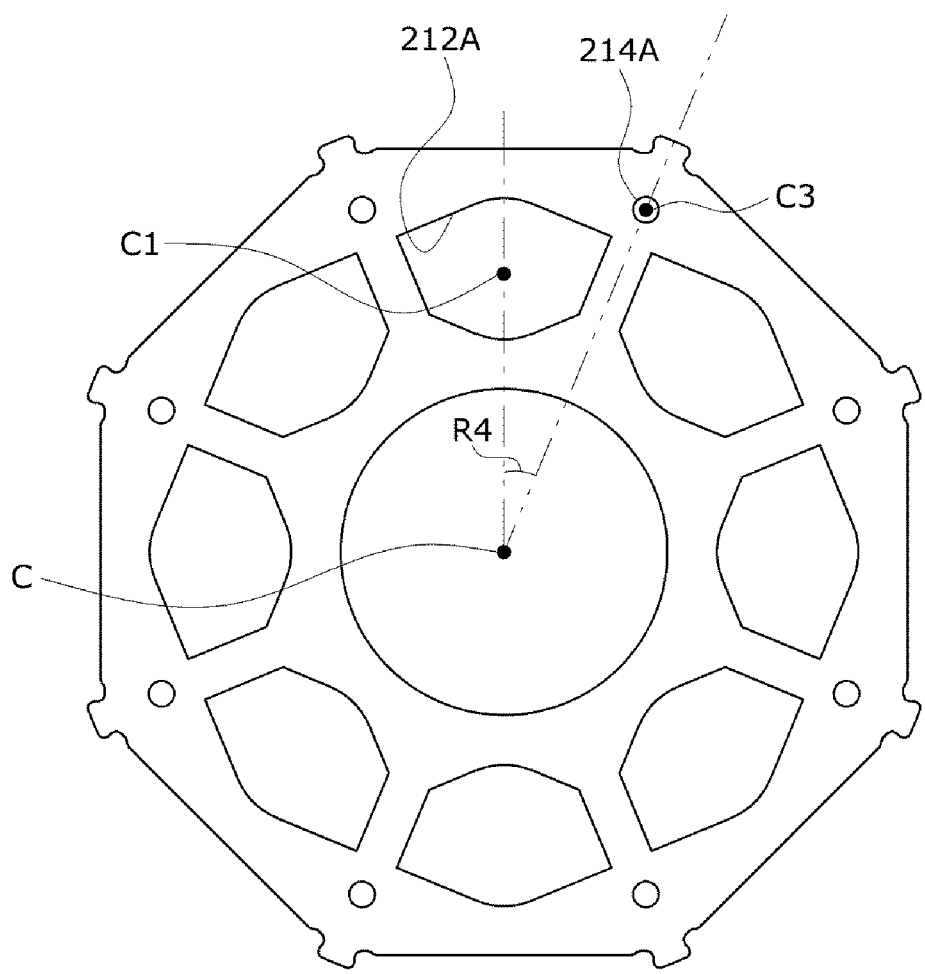

[FIG. 7]
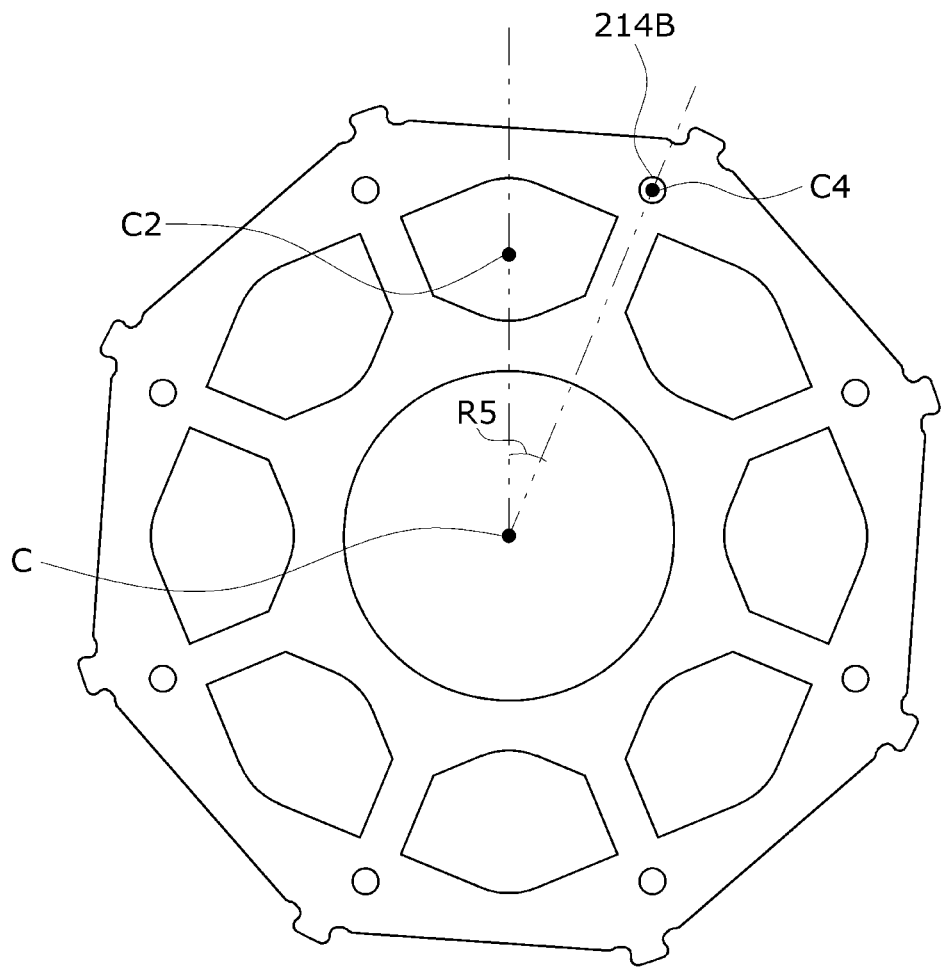

[FIG. 8]
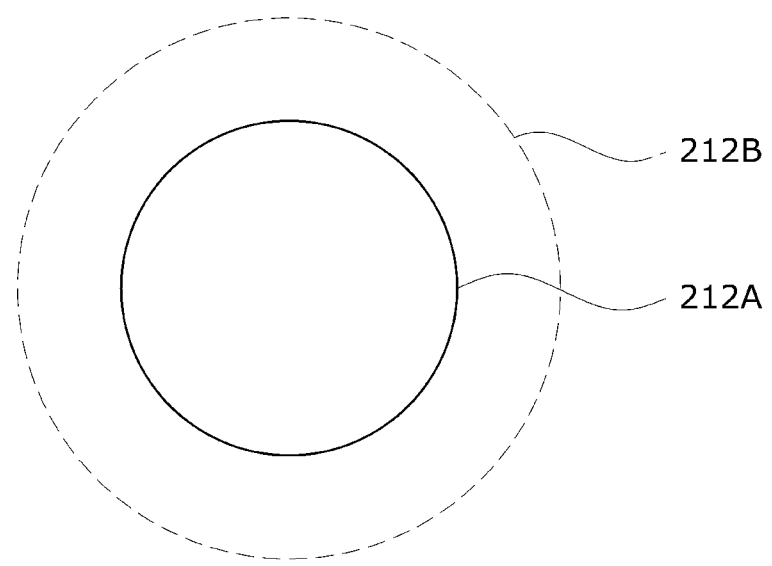

[FIG. 9]
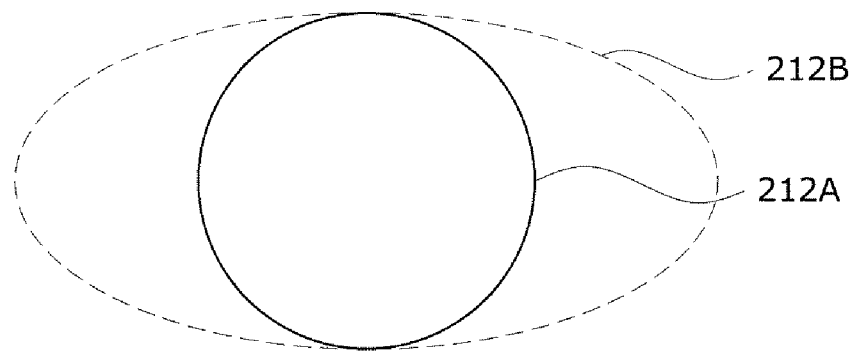

[FIG. 10]
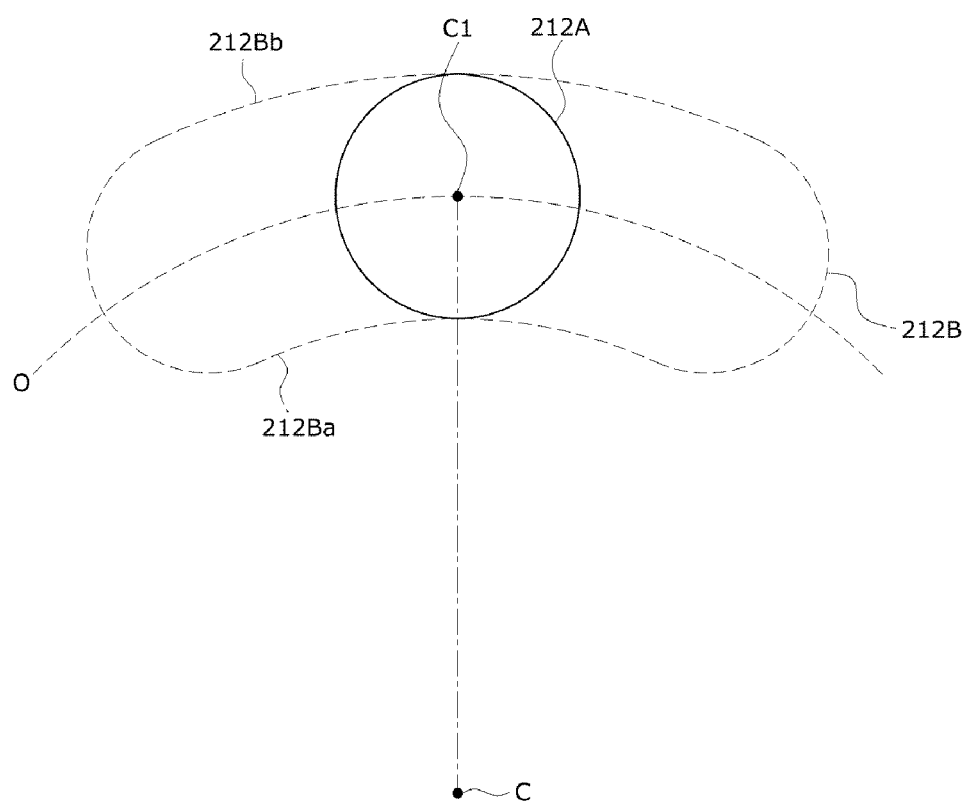

[FIG. 11]
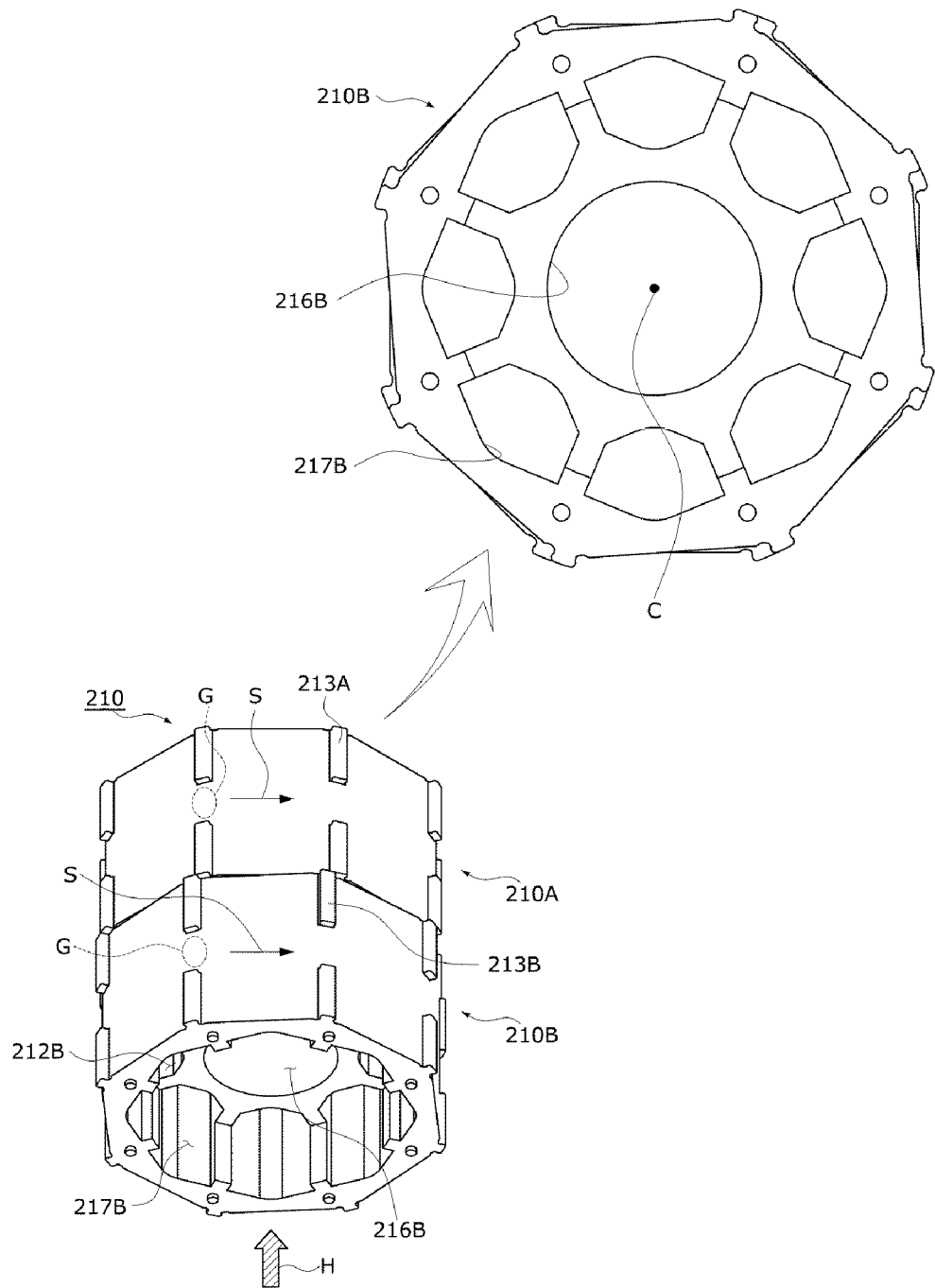

[FIG. 12]
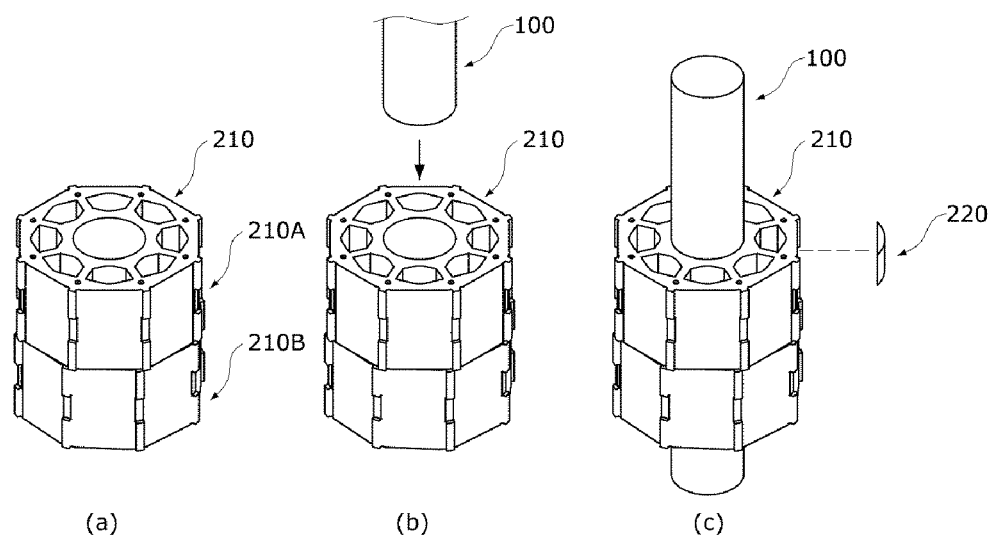

MOTOR

CROSS REFERENCE TO RELATED APPLICATIONS

This application is the National Phase of PCT International Application No. PCT/KR2020/010958, filed on Aug. 18, 2020, which claims priority under 35 U.S.C. 119(a) to Patent Application No. 10-2019-0101189, filed in the Republic of Korea on Aug. 19, 2019, all of which are hereby expressly incorporated by reference into the present application.

TECHNICAL FIELD

The present invention relates to a motor.

BACKGROUND ART

An electric power steering (EPS) system is an apparatus which secures turning stability of a vehicle and rapidly provides a restoring force so that a driver can safely drive the vehicle. An EPS system controls a vehicle's steering shaft to be driven by driving a motor using an electronic control unit (ECU) according to driving conditions detected by a vehicle speed sensor, a torque angle sensor, a torque sensor, and the like.

The motor includes a stator and a rotor. The rotor may include rotor cores and magnets disposed on the rotor cores. A cogging torque may be generated due to a difference in magnetic permeability between the stator formed of a metal material and an open slot which is a space that is empty when the rotor rotates. In order to reduce the cogging torque, the rotor cores and the magnets are formed as a plurality of pucks, and the pucks are assembled to form a skew.

However, since the plurality of pucks should be assembled, there are problems in that the number of processes increases and a process time increases. In addition, since a skew angle of the plurality of pucks should be adjusted, there is a problem in that it is difficult to manage the skew angle.

DISCLOSURE

Technical Problem

The present invention is directed to providing a motor of which the number of manufacturing processes and a manufacturing time are reduced, skew angle management of a rotor is easy, and a cogging torque is reducible.

Objectives that have to be solved according to the embodiments are not limited to the above-described objectives, and other objectives which are not described above will be clearly understood by those skilled in the art from the following specification.

Technical Solution

One aspect of the present invention provides a motor including a rotor and a stator disposed to correspond to the rotor, wherein the rotor includes a first rotor core and a second rotor core stacked on each other in an axial direction, the first rotor core includes a first surface on which a magnet is disposed and a first hole which passes through the first rotor core in the axial direction, the second rotor core includes a second surface on which a magnet is disposed and a second hole which passes through the second rotor core in the axial direction, the first surface and the second surface are disposed to be misaligned with each other around a center of the rotor in a circumferential direction, and the first hole and the second hole are disposed to be aligned with each other.

Another aspect of the present invention provides a motor including a rotor and a stator disposed to correspond to the rotor, wherein the rotor includes a first rotor core and a second rotor core disposed to be stacked on each other in an axial direction, the first rotor core includes a first protrusion protruding in a radial direction based on a center of the rotor and a first hole passing through the first rotor core in the axial direction, the second rotor core includes a second protrusion protruding in the radial direction based on the center of the rotor and a second hole passing through the second rotor core in the axial direction, the first protrusion and the second protrusion are disposed to be misaligned with each other in a circumferential direction based on the center of the rotor, and the first hole and the second hole are disposed to be aligned with each other.

Still another aspect of the present invention provides a motor including a rotor and a stator disposed to correspond to the rotor, wherein the rotor includes a first rotor core and a second rotor core which are disposed to be stacked on each other in an axial direction, the first rotor core includes a first protrusion protruding in a radial direction based on a center of the rotor and a plurality of first holes passing through the first rotor core in the axial direction, The second rotor core may include a second protrusion protruding in the radial direction based on the center of the rotor and a plurality of second holes passing through the second rotor core in the axial direction, the plurality of adjacent first holes may be symmetrically disposed with respect to a first reference line which passes through a width center of the first protrusion in a circumferential direction from the center of the rotor, and the plurality of adjacent second holes may be asymmetrically disposed with respect to a second reference line which passes through a width center of the second protrusion in the circumferential direction from the center of the rotor.

The first surface and the second surface may be flat surfaces.

The first rotor core may include a third protrusion convexly disposed on a lower surface of the first rotor core, the second rotor core may include a first groove which is concavely disposed in an upper surface of the second rotor core and in which the third protrusion is disposed, and an angle formed by a virtual line connecting the center of the rotor and a center of the first hole and a virtual line connecting the center of the rotor and a center of the third protrusion may be the same as an angle formed by a virtual line connecting the center of the rotor and a center of the second hole and a virtual line connecting the center of the rotor and a center of the first groove.

A size and a shape of the first hole may be the same as a size and a shape of the second hole.

A size of the second hole may be greater than a size of the first hole, and a shape of the first hole and a shape of the second hole may be different.

An entire region of the first hole may be disposed to overlap the second hole in the axial direction.

The first hole may be disposed not to overlap any region of the second rotor core excluding the second hole in the axial direction.

Any one of the first rotor core and the second rotor core may include a third hole and a fourth hole through which a shaft passes, the third hole may be in contact with the shaft, the fourth hole may be disposed to be larger than the third hole and may not be in contact with the shaft, and the fourth hole may be disposed to overlap the first hole and the second hole in the axial direction.

The fourth hole may be disposed further outward than the third hole in the axial direction.

Advantageous Effects

According to an embodiment, an advantageous effect of significantly reducing a cogging torque is provided.

Advantageous effects of reducing the number of manufacturing processes and a manufacturing time are provided.

An advantageous effect of easily managing a skew angle of a rotor is provided.

DESCRIPTION OF DRAWINGS

FIG. 1 is a view illustrating a motor according to an embodiment.

FIG. 2 is a view illustrating a rotor core.

FIG. 3 is a view illustrating a first rotor core.

FIG. 4 is a view illustrating a second rotor core.

FIG. 5 is a view illustrating the first rotor core including a third protrusion and the second rotor core including a first groove.

FIG. 6 is a view illustrating a lower surface of the first rotor core at which the third protrusion and a first hole are positioned.

FIG. 7 is a view illustrating an upper surface of the second rotor core at which a first groove and a second hole are positioned.

FIG. 8 is a view illustrating a first hole and a second hole with different sizes.

FIGS. 9 and 10 are views illustrating a first hole and a second hole with different shapes.

FIG. 11 is a view illustrating the second rotor core including a third hole and a fourth hole.

FIG. 12 is a set of views illustrating a manufacturing process of the rotor.

MODES OF THE INVENTION

Hereinafter, exemplary embodiments of the present invention will be described in detail with reference to the accompanying drawings.

However, the technical spirit of the present invention is not limited to the few embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings generally understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the element are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on or under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

FIG. 1 is a view illustrating a motor according to an embodiment.

Referring to FIG. 1, a motor according to the embodiment may include a shaft 100, a rotor 200, a stator 300, an insulator 400, a housing 500, a busbar 600, a sensing unit 700, and a substrate 800. Hereinafter, the term "inward" refers to a direction from the housing 500 toward the shaft 100 which is a center of the motor, and the term "outward" refers to a direction opposite to "inward," that is, the direction from the shaft 100 toward the housing 500. In addition, hereinafter, a circumferential direction or radial direction is defined based on an axial center.

The shaft 100 may be coupled to the rotor 200. When an electromagnetic interaction occurs between the rotor 200 and the stator 300 due to the supply of a current, the rotor 200 rotates, and the shaft 100 rotates in conjunction with the rotor 200. The shaft 100 is rotatably supported by bearings 10. The shaft 100 may be connected to a vehicle's steering system, and power may be transmitted to the vehicle's steering system through the shaft 100.

The rotor 200 rotates through the electrical interaction with the stator 300. The rotor 200 may be disposed inside the stator 300. The rotor 200 may include a rotor core 210 and magnets 220 disposed on the rotor core 210. In this case, the rotor 200 may be a surface permanent magnet (SPM) type rotor in which the magnets 220 are disposed on an outer circumferential surface of the rotor core 210.

The stator 300 is disposed outside the rotor 200. The stator 300 may include a stator core 300A, coils 300B, and an insulator 400 installed on the stator core 300A. The coils 300B may be wound around the insulator 400. The insulator 400 is disposed between the coils 300B and the stator core 300A to electrically insulate the stator core 300A from the coils 300B. The coils 300B induce an electrical interaction with the magnets 220.

The busbar 600 is disposed on an upper side of the stator 300. The busbar 600 includes a busbar holder (not shown) formed of an insulating material and a plurality of terminals (not shown) coupled to the busbar holder. In this case, the busbar holder is formed of an insulating material to prevent the plurality of terminals from being connected to each other. In addition, the plurality of terminals serve to connect the coils 300B wound around the stator core 300A to allow a current to be applied to the coils.

The sensing unit 700 may be coupled to the shaft 100. The sensing unit 700 includes a sensing plate 700A and a sensing magnet 700B disposed on the sensing plate. A sensor, which detects a magnetic force of the sensing magnet (not shown), may be disposed on the substrate 800. In this case, the sensor may be a Hall integrated circuit (IC) and serve to detect a magnetic flux of the sensing magnet of the sensing unit 700 coupled to the shaft 100. The sensing unit 700 and the substrate 800 serve to detect a position of the rotor 200 by detecting the magnetic flux changed according to rotation.

FIG. 2 is a view illustrating a rotor core.

Referring to FIGS. 1 and 2, the rotor 200 may include the rotor core 210 and the magnets 220.

The rotor core 210 may include a first rotor core 210A and a second rotor core 210B. The magnets 220 may be disposed on outer circumferential surfaces of the first rotor core 210A and the second rotor core 210B. The first rotor core 210A and the second rotor core 210B may be disposed to be stacked on each other in an axial direction. Hereinafter, a rotor core disposed relatively higher may be the first rotor core 210A and a rotor core disposed relatively lower may be the second rotor core 210B. The first rotor core 210A and the second rotor core 210B may be disposed to be misaligned with each other to have a skew angle. The first rotor core 210A and the second rotor core 210B may be a single part produced using one mold to have a skew angle.

FIG. 3 is a view illustrating the first rotor core 210A.

Referring to FIGS. 2 and 3, the first rotor core 210A may include first surfaces 211A and first holes 212A.

The first surfaces 211A may be defined as parts of an outer surface of the first rotor core 210A on which the magnets 220 are disposed. The first surfaces 211A may be flat surfaces. In the drawings, the first surfaces 211A are illustrated as flat surfaces, but the present invention is not limited thereto, and the first surfaces 211A may also be curved surfaces. The first surfaces 211A may be disposed to extend in a longitudinal direction of the first rotor core 210A. The number of first surfaces 211A corresponds to the number of the magnets 220 disposed on the first rotor core 210A.

The first holes 212A may be formed to pass through the first rotor core 210A in the axial direction. The plurality of first holes 212A may be disposed. The plurality of first holes 212A may be disposed at predetermined intervals in a circumferential direction of the first rotor core 210A. A part of an element of a mold for manufacturing the rotor core 210 may be inserted into the first holes 212A. The first rotor core 210A may include a plurality of first protrusions 213A.

The first protrusions 213A protrude from the outer surface of the first rotor core 210A in a radial direction. The first protrusions 213A may be protrusions for guiding the magnets 220 disposed on the first surfaces 211A. The first protrusions 213A may be disposed between the first surfaces 211A in a circumferential direction.

A virtual line connecting a width center P1 of one of the first protrusions 213A in the circumferential direction and an axial center C is referred to as a first reference line L1.

Among the plurality of first holes 212A, the adjacent first holes 212A may be symmetrically disposed with respect to the first reference lines L1. For example, an angle formed by a center C1 of any one of the adjacent first holes 212A and the width center P1 of one of the first protrusions 213A in the circumferential direction may be the same as an angle formed by a center C1 of the other of the adjacent first holes 212A and the width center P1 of the first protrusion 213A in the circumferential direction as a first angle R1. In this case, the centers C1 of the first holes 212A may be center of the first holes 212A in the circumferential direction.

FIG. 4 is a view illustrating the second rotor core 210B.

Referring to FIGS. 2 and 4, the second rotor core 210B may include second surfaces 211B and second holes 212B. The second surfaces 211B and the first surfaces 211A may be disposed to be misaligned with each other by a set skew angle in the circumferential direction. Conversely, the second holes 212B may be disposed to be aligned with the first holes 212A in the circumferential and radial directions.

The second surfaces 211B may be defined as parts of an outer surface of the second rotor core 210B on which the magnets 220 are disposed. The second surfaces 211B may be flat surfaces. In the drawings, the second surfaces 211B are illustrated as flat surfaces, but the present invention is not limited thereto, and the second surfaces 211B may also be curved surfaces. The second surfaces 211B may be disposed to extend in a longitudinal direction of the second rotor core 210B. The number of the second surfaces 211B corresponds to the number of the magnets 220 disposed on the second rotor core 210B.

The second holes 212B may be formed to pass through the second rotor core 210B in the axial direction. The plurality of second holes 212B may be disposed. The plurality of second holes 212B may be disposed at predetermined intervals in a circumferential direction of the second rotor core 210B. The part of the element of the mold for manufacturing the rotor core 210 may be inserted into the second holes 212B.

The second rotor core 210B may include a plurality of second protrusions 213B. The second protrusions 213B protrude from the outer surface of the second rotor core 210B in the radial direction. The second protrusions 213B may be protrusions for guiding the magnets 220 disposed on the second surfaces 211B. The second protrusions 213B may be disposed between the second surfaces 211B in the circumferential direction.

A virtual line connecting a width center P2 of one of the second protrusions 213B in the circumferential direction and the axial center C is referred to as a second reference line L2.

Among the plurality of second holes 212B, the adjacent second holes 212B may be asymmetrically disposed with respect to the second reference lines L2. For example, a second angle R2 formed by a center C2 of any one of the adjacent second holes 212B and a width center P2 of one of the second protrusions 213B in the circumferential direction and a third angle R3 formed by a center C2 of the other of the adjacent second holes 212B and the width center P2 of the second protrusion 213B in the circumferential direction may be different. The first angle R1 and the second angle R2 may also be different. In addition, the first angle R1 and the third angle R3 may also be different. The first angle R1 may be greater than the second angle R2 and smaller than the third angle R3.

This is to align the first holes 212A and the second holes 212B in a state in which the first rotor core 210A and the second rotor core 210B are misaligned by the skew angle in the circumferential direction. The first rotor core 210A and the second rotor core 210B are manufactured as the rotor core 210 that is one part manufactured using one mold. In this case, in order to insert the part of the element of the mold into the first holes 212A and the second holes 212B together, the first holes 212A and the second holes 212B should be aligned.

Referring to FIGS. 2, 3, and 4, since the first holes 212A and the second holes 212B are aligned, a plurality of plates may be integrally stacked and fixed and coupled to each other through a punching process. In this case, through the punching process, protrusion or groove structures 215A, 214A, and 214B, which are formed by punching, may be formed in the plurality of plates constituting the first rotor core 210A and the second rotor core 210B. In this case, among the plurality of plates, grooves 215A are concavely formed in an uppermost surface of an uppermost plate, and protrusions (not shown) are formed to convexly protrude from a lowermost surface of a lowermost plate.

FIG. 5 is a view illustrating the first rotor core 210A including third protrusions 214A and the second rotor core 210B including first grooves 214B. Unlike a process of stacking a plurality of plates and punching the plurality of plates, the first rotor core 210A may be manufactured by stacking and punching the plurality of plates, the second rotor core 210B may be manufactured by stacking and punching the plurality of plates, and the first rotor core 210A and the second rotor core 210B manufactured as described above may be coupled by fitting protrusion and groove structures formed in the punching processes. In this case, since the first holes 212A and the second holes 212B are naturally aligned, the first rotor core 210A and the second rotor core 210B may be easily coupled without a separate guide for alignment.

Referring to FIG. 5, the first rotor core 210A may include the third protrusions 214A. The third protrusions 214A are convexly disposed on a lower surface of the first rotor core 210A. The first rotor core 210A may be formed by the plurality of plates being stacked, and the third protrusions 214A may be structures which protrude in a process of coupling the stacked plates.

The second rotor core 210B may include the first grooves 214B. The first grooves 214B are concavely disposed in an upper surface of the second rotor core 210B. The second rotor core 210B may be formed by the plurality of plates being stacked, and the first grooves 214B may be structures that are concavely formed in a process of coupling the stacked plates.

Accordingly, the third protrusions 214A and the first grooves 214B are aligned with and press-fitted to each other so that the first rotor core 210A and the second rotor core 210B may be fixedly coupled.

FIG. 6 is a view illustrating the lower surface of the first rotor core 210A at which the third protrusions 214A and the first holes 212A are positioned, and FIG. 7 is a view illustrating the upper surface of the second rotor core 210B at which the first grooves 214B and the second holes 212B are positioned.

Referring to FIGS. 6 and 7, when an angle formed by the center C1 of one of the first holes 212A and a center C3 of one of the third protrusions 214A in the circumferential direction is referred to as a fourth angle R4, and an angle formed by the center C2 of one of the second holes 212B and a center C4 of one of the first grooves 214B in the circumferential direction is referred to as a fifth angle R5, the fourth angle R4 may be equal to the fifth angle R5. In this case, the fourth angle R4 and the fifth angle R5 may both be equal to the first angle R1.

This is to maintain coupling of the first rotor core 210A and the second rotor core 210B while aligning the first holes 212A with the second holes 212B.

Meanwhile, the first holes 212A are disposed not to overlap any region of the second rotor core 210B excluding the second holes 212B in the axial direction. This is to allow the part of the element of the mold for manufacturing the rotor core 210 to pass through the first holes 212A and reach the second holes 212B. Accordingly, even in the process of stacking the plurality of plates to form the rotor core 210, the part of the element of the mold is allowed to pass through the first holes 212A and the second holes 212B so that the first rotor core 210A and the second rotor core 210B may be aligned at the same time and the punching process may be integrally performed. Even after the stacking of the plurality of plates, the first rotor core 210A and the second rotor core 210B may be moved in the integrated form of the rotor core 210 without separating and moving the first rotor core 210A and the second rotor core 210B.

FIG. 8 is a view illustrating a first hole 212A and a second hole 212B with different sizes.

Referring to FIG. 8, the size of the first hole 212A may be smaller than the size of the second hole 212B. For example, the first hole 212A and the second hole 212B may have circular shapes, and an entire region of the first hole 212A may be disposed to overlap the second hole 212B in an axial direction.

FIGS. 9 and 10 are views illustrating a first hole 212A and a second hole 212B with different shapes.

Referring to FIG. 9, a size of the first hole 212A may be smaller than a size of the second hole 212B. In addition, the first hole 212A may have a circular shape, and the second hole 212B may have an oval shape.

Referring to FIG. 10, a size of the first hole 212A may be smaller than a size of the second hole 212B. In addition, the second hole 212B may have an elongated hole shape having an inner circumferential surface 213Ba and an outer circumferential surface 212Bb. The shape of the second hole 212B may be determined so that a center of the second hole 212B in a radial direction is formed along a circular orbit O which passes through a center C1 of the first hole 212A about a center C of a rotor core 210. Since the entire region of the first hole 212A may be disposed to overlap the second hole 212B in an axial direction due to the shape of the first hole 212A and the shape of the second hole 212B to correspond to various skew angles, there is an advantage in that skew angle management is very easy.

FIG. 11 is a view illustrating the second rotor core 210B including a third hole 216B and fourth holes 217B.

Press-fitting of the shaft 100 is started with either of the first rotor core 210A and the second rotor core 210B. Accordingly, an identification structure for press-fitting the shaft 100 may be disposed on the first rotor core 210A or the second rotor core 210B. For example, the fourth holes 217B may be disposed in the second rotor core 210B as the identification structure. The third hole 216B is a hole to which the shaft 100 is press-fitted, and an inner wall of the third hole 216B is in contact with the shaft 100. As can be seen in a direction of an arrow H in FIG. 11, the fourth holes 217B are formed to have greater sizes than the third hole 216B, and thus the fourth holes 217B are not in contact with the shaft 100. The fourth holes 217B are disposed further outward than the third hole 216B in the axial direction so that an operator may easily check the fourth holes 217B visually. The fourth holes 217B may be disposed to overlap the first holes 212A and the second holes 212B in the axial direction.

Meanwhile, coating regions G from which the first protrusions 213A and the second protrusions 213B are removed in the axial direction may be disposed on the first rotor core 210A. Such a plurality of coating regions G are arranged in the circumferential direction.

The coating regions G are regions for easily applying an adhesive to allow the magnets 220 to be easily attached to the rotor core 210. In a state in which a coating tool that supplies an adhesive is disposed on the coating regions G, when the rotor core 210 is rotated, the adhesive may be quickly and easily applied on the rotor core 210 while the coating tool moves along an arrow S of FIG. 11.

FIG. 12 is a set of views illustrating a manufacturing process of the rotor 200.

As illustrated in FIG. 12A, the rotor core 210 in which the first rotor core 210A and the second rotor core 210B are stacked and integrally formed to have a skew angle is provided.

Then, as illustrated in FIG. 12B, the shaft 100 is press-fitted to the rotor core 210. Then, as illustrated in FIG. 12C, the magnets 220 are attached to the rotor core 210. Before the magnets 220 are attached to the rotor core 210, the adhesive may be applied thereon through the coating regions G as described with reference to FIG. 11.

In the manufacturing process of the rotor 200, a manufacturing process of assembling the first rotor core 210A and the second rotor core 210B is not required. In addition, since there is no process of adjusting the skew angle, there are advantages in that an error of the skew angle can be reduced and skew angle management is easy.

A motor according to one exemplary embodiment of the present invention has been described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted with reference to the appended claims and encompass all equivalents falling within the scope of the appended claims.

The invention claimed is:

1. A motor comprising:
   a rotor; and
   a stator disposed to correspond to the rotor,
   wherein the rotor includes a first rotor core and a second rotor core which are disposed to be stacked on each other in an axial direction,
   wherein the first rotor core includes a first protrusion protruding in a radial direction based on a center of the rotor and a plurality of first holes passing through the first rotor core in the axial direction,
   wherein the second rotor core includes a second protrusion protruding in the radial direction based on the center of the rotor and a plurality of second holes passing through the second rotor core in the axial direction,
   wherein an angle formed by a center of any one of the adjacent first holes and a width center of one of the first protrusions in a circumferential direction is the same as an angle formed by a center of an other of the adjacent first holes and the width center of the first protrusion in the circumferential direction,
   wherein a second angle formed by a center of any one of the adjacent second holes and a width center of one of the second protrusions in the circumferential direction and a third angle formed by a center of an other of the adjacent second holes and the width center of the second protrusion in the circumferential direction is different,
   wherein the first protrusion and the second protrusion are disposed to be misaligned with each other in the circumferential direction based on the center of the rotor, and
   wherein the first hole and the second hole are disposed to be aligned with each other.

2. The motor of claim 1, wherein a size of the second hole is greater than a size of the first hole, and
   wherein a shape of the first hole and a shape of the second hole are different.

3. The motor of claim 1, wherein an entire region of the first hole is disposed to overlap the second hole in the axial direction.

4. The motor of claim 1, wherein the first hole is disposed not to overlap any region of the second rotor core excluding the second hole in the axial direction.

5. The motor of claim 1, wherein the first rotor core includes a third protrusion convexly disposed on a lower surface of the first rotor core,
   wherein the second rotor core includes a first groove which is concavely disposed in an upper surface of the second rotor core and in which the third protrusion is disposed, and
   wherein an angle formed by a virtual line connecting the center of the rotor and a center of the first hole and a virtual line connecting the center of the rotor and a center of the third protrusion is the same as an angle formed by a virtual line connecting the center of the rotor and a center of the second hole and a virtual line connecting the center of the rotor and a center of the first groove.

6. The motor of claim 1, wherein a size and a shape of the first hole are the same as a size and a shape of the second hole.

7. The motor of claim 1, wherein a size of the second hole is greater than a size of the first hole, and
   wherein a shape of the first hole and a shape of the second hole are different.

8. The motor of claim 1, wherein an entire region of the first hole is disposed to overlap the second hole in the axial direction.

9. The motor of claim 1, wherein the first hole is disposed not to overlap any region of the second rotor core excluding the second hole in the axial direction.

10. A motor comprising:
    a rotor; and
    a stator disposed to correspond to the rotor,
    wherein the rotor includes a first rotor core and a second rotor core which are disposed to be stacked on each other in an axial direction,
    wherein the first rotor core includes a first protrusion protruding in a radial direction based on a center of the rotor and a plurality of first holes passing through the first rotor core in the axial direction,
    wherein the second rotor core includes a second protrusion protruding in the radial direction based on the center of the rotor and a plurality of second holes passing through the second rotor core in the axial direction,
    wherein an angle formed by a center of any one of the adjacent first holes and a width center of one of the first protrusions in a circumferential direction is the same as an angle formed by a center of an other of the adjacent first holes and the width center of the first protrusion in the circumferential direction,
    wherein a second angle formed by a center of any one of the adjacent second holes and a width center of one of the second protrusions in the circumferential direction and a third angle formed by a center of an other of the adjacent second holes and the width center of the second protrusion in the circumferential direction is different, wherein the first rotor core includes a first surface on which a magnet is disposed, wherein the second rotor core includes a second surface on which a magnet is disposed, wherein the first surface and the second surface are disposed to be misaligned with each other around the center of the rotor in the circumferential direction, and wherein the first hole and the second hole are disposed to be aligned with each other.

11. The motor of claim 10, wherein the first surface and the second surface are flat surfaces.

12. The motor of claim 10, wherein the first rotor core includes a third protrusion convexly disposed on a lower surface of the first rotor core, wherein the second rotor core includes a first groove which is concavely disposed in an upper surface of the second rotor core and in which the third protrusion is disposed, and wherein an angle formed by a virtual line connecting the center of the rotor and a center of the first hole and a virtual line connecting the center of the rotor and a center of the third protrusion is the same as an angle formed by a virtual line connecting the center of the rotor and a center of the second hole and a virtual line connecting the center of the rotor and a center of the first groove.

13. The motor of claim 10, wherein a size and a shape of the first hole are the same as a size and a shape of the second hole.

14. The motor of claim 10, wherein a size of the second hole is greater than a size of the first hole, and wherein a shape of the first hole and a shape of the second hole are different.

15. The motor of claim 10, wherein an entire region of the first hole is disposed to overlap the second hole in the axial direction.

16. The motor of claim 10, wherein the first hole is disposed not to overlap any region of the second rotor core excluding the second hole in the axial direction.

17. A motor comprising:
a rotor; and
a stator disposed to correspond to the rotor,
wherein the rotor includes a first rotor core and a second rotor core which are disposed to be stacked on each other in an axial direction,
wherein the first rotor core includes a first protrusion protruding in a radial direction based on a center of the rotor and a plurality of first holes passing through the first rotor core in the axial direction,
wherein the second rotor core includes a second protrusion protruding in the radial direction based on the center of the rotor and a plurality of second holes passing through the second rotor core in the axial direction,
wherein an angle formed by a center of any one of the adjacent first holes and a width center of one of the first protrusions in a circumferential direction is the same as an angle formed by a center of an other of the adjacent first holes and the width center of the first protrusion in the circumferential direction,
wherein a second angle formed by a center of any one of the adjacent second holes and a width center of one of the second protrusions in the circumferential direction and a third angle formed by a center of an other of the adjacent second holes and the width center of the second protrusion in the circumferential direction is different, wherein the first rotor core includes a third protrusion convexly disposed on a lower surface of the first rotor core, wherein the second rotor core includes a first groove which is concavely disposed in an upper surface of the second rotor core and in which the third protrusion is disposed, and wherein an angle formed by a virtual line connecting the center of the rotor and a center of the first hole and a virtual line connecting the center of the rotor and a center of the third protrusion is the same as an angle formed by a virtual line connecting the center of the rotor and a center of the second hole and a virtual line connecting the center of the rotor and a center of the first groove.

18. A motor comprising:
a rotor; and
a stator disposed to correspond to the rotor,
wherein the rotor includes a first rotor core and a second rotor core which are disposed to be stacked on each other in an axial direction,
wherein the first rotor core includes a first protrusion protruding in a radial direction based on a center of the rotor and a plurality of first holes passing through the first rotor core in the axial direction,
wherein the second rotor core includes a second protrusion protruding in the radial direction based on the center of the rotor and a plurality of second holes passing through the second rotor core in the axial direction,
wherein an angle formed by a center of any one of the adjacent first holes and a width center of one of the first protrusions in a circumferential direction is the same as an angle formed by a center of an other of the adjacent first holes and the width center of the first protrusion in the circumferential direction,
wherein a second angle formed by a center of any one of the adjacent second holes and a width center of one of the second protrusions in the circumferential direction and a third angle formed by a center of an other of the adjacent second holes and the width center of the second protrusion in the circumferential direction is different, and
wherein a size and a shape of the first hole are the same as a size and a shape of the second hole.

19. A motor comprising:
a rotor; and
a stator disposed to correspond to the rotor,
wherein the rotor includes a first rotor core and a second rotor core which are disposed to be stacked on each other in an axial direction,
wherein the first rotor core includes a first protrusion protruding in a radial direction based on a center of the rotor and a plurality of first holes passing through the first rotor core in the axial direction,
wherein the second rotor core includes a second protrusion protruding in the radial direction based on the center of the rotor and a plurality of second holes passing through the second rotor core in the axial direction,
wherein an angle formed by a center of any one of the adjacent first holes and a width center of one of the first protrusions in a circumferential direction is the same as an angle formed by a center of an other of the adjacent first holes and the width center of the first protrusion in the circumferential direction, wherein a second angle formed by a center of any one of the adjacent second holes and a width center of one of the second protrusions in the circumferential direction and a third angle formed by a center of an other of the adjacent second holes and the width center of the second protrusion in the circumferential direction is different, wherein any one of the first rotor core and the second rotor core includes a third hole and a fourth hole through which a shaft passes, wherein the third hole is in contact with the shaft, wherein the fourth hole is disposed to be larger than the third hole and is not in contact with the shaft, and wherein the fourth hole is disposed to overlap the first hole and the second hole in the axial direction.

* * * * *